US009030535B2

(12) United States Patent
Kim

(10) Patent No.: US 9,030,535 B2
(45) Date of Patent: May 12, 2015

(54) SHUTTER GLASSES, METHOD FOR ADJUSTING OPTICAL CHARACTERISTICS THEREOF, AND 3D DISPLAY SYSTEM ADAPTED FOR THE SAME

(75) Inventor: Seong-Hun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 13/380,193

(22) PCT Filed: Apr. 29, 2010

(86) PCT No.: PCT/KR2010/002714
§ 371 (c)(1),
(2), (4) Date: Dec. 22, 2011

(87) PCT Pub. No.: WO2010/150973
PCT Pub. Date: Dec. 29, 2010

(65) Prior Publication Data
US 2012/0098830 A1    Apr. 26, 2012

Related U.S. Application Data

(60) Provisional application No. 61/219,392, filed on Jun. 23, 2009.

(51) Int. Cl.
*G06T 15/00* (2011.01)
*G02F 1/13* (2006.01)
*G02B 27/22* (2006.01)
*H04N 13/00* (2006.01)
*H04N 13/04* (2006.01)

(52) U.S. Cl.
CPC ........ *G02B 27/2264* (2013.01); *H04N 13/0029* (2013.01); *H04N 13/004* (2013.01); *H04N 13/0422* (2013.01); *H04N 13/0438* (2013.01); *H04N 13/0497* (2013.01); *H04N 2213/008* (2013.01)

(58) Field of Classification Search
None
See application file for complete search history.

(56) References Cited

U.S. PATENT DOCUMENTS

| 5,742,331 | A  | * | 4/1998 | Uomori et al. ................... 348/51 |
| 6,384,859 | B1 | * | 5/2002 | Matsumoto et al. ............. 348/43 |
| 6,791,599 | B1 | * | 9/2004 | Okada et al. ..................... 348/56 |
| 7,405,801 | B2 | * | 7/2008 | Jacobs ............................ 352/85 |
| 8,525,775 | B2 | * | 9/2013 | Ham .............................. 345/108 |
| 2002/0175886 | A1 | | 11/2002 | Ham |
| 2005/0030301 | A1 | * | 2/2005 | Harrold et al. ................ 345/204 |
| 2005/0046700 | A1 | * | 3/2005 | Bracke ....................... 348/218.1 |

(Continued)

OTHER PUBLICATIONS

International Search Report issued in PCT Application No. PCT/KR2010/002714 dated Nov. 26, 2010.

*Primary Examiner* — Jay Patel
*Assistant Examiner* — Reza Aghevli
(74) *Attorney, Agent, or Firm* — KED & Associates, LLP

(57) ABSTRACT

Disclosed are shutter glasses capable of automatically changing brightness according to image characteristics and allowing a viewer to adjust brightness and a color temperature according to his preference, a method for adjusting light characteristics of the shutter glasses, and a display system employing the same. The shutter glasses adaptive to be used for a three-dimensional (3D) display device. The shutter glasses include: a pair of shutter liquid crystal panels prepared to correspond to user's left and right eyes; and a controller configured to turn on and off the shutter liquid crystal panels at a certain frequency and control light transmittance of the shutter liquid crystal panels by a gamma voltage corresponding to a certain level control signal.

9 Claims, 8 Drawing Sheets

(56) References Cited

U.S. PATENT DOCUMENTS

| | | | |
|---|---|---|---|
| 2007/0040822 A1* | 2/2007 | Koyama et al. | 345/204 |
| 2007/0146478 A1* | 6/2007 | Butler-Smith et al. | 348/47 |
| 2008/0151040 A1 | 6/2008 | Kim | |
| 2008/0246757 A1* | 10/2008 | Ito | 345/419 |
| 2008/0303963 A1 | 12/2008 | Jung et al. | |
| 2009/0002349 A1* | 1/2009 | Cok et al. | 345/204 |
| 2009/0051711 A1* | 2/2009 | Evanicky et al. | 345/690 |
| 2009/0115751 A1* | 5/2009 | Gover et al. | 345/204 |

* cited by examiner

Fig. 2
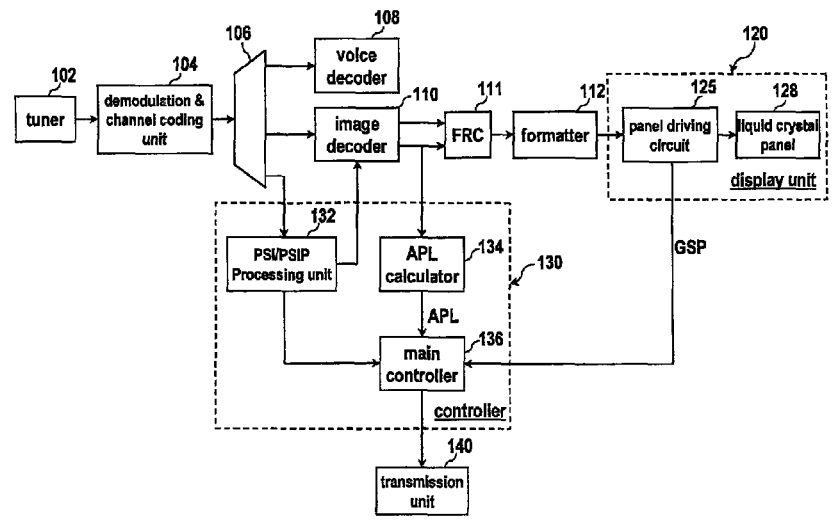
Fig. 3
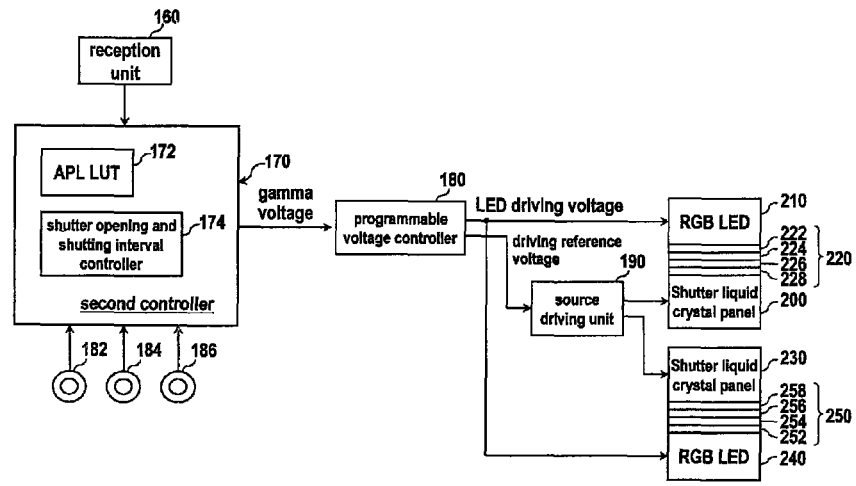
Fig. 4
| APL | gamma voltage [V] |
|---|---|
| 1 | 2 |
| 2 | 3 |
| 3 | 4 |
| 4 | 5 |
| 5 | 6 |

Fig. 5
| APL | gamma voltage [V] |
|---|---|
| 1 | 6 |
| 2 | 5 |
| 3 | 4 |
| 4 | 3 |
| 5 | 2 |
Fig. 6
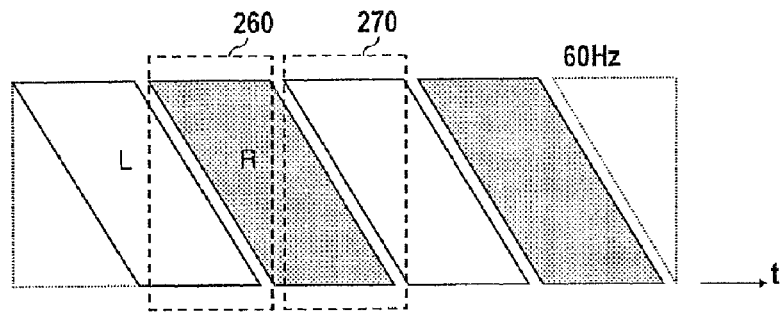
Fig. 7
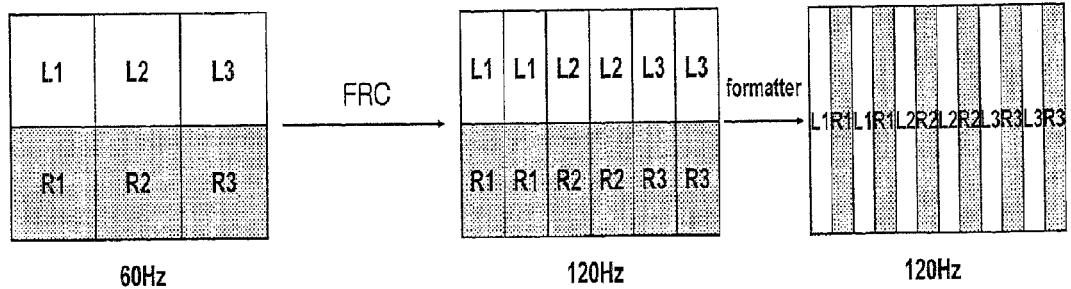
Fig. 8
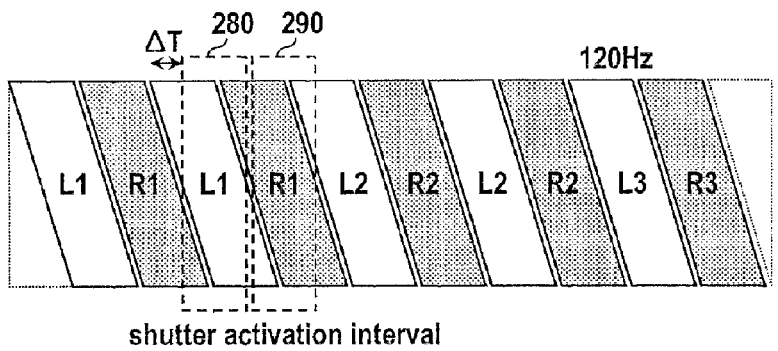

SHUTTER GLASSES, METHOD FOR ADJUSTING OPTICAL CHARACTERISTICS THEREOF, AND 3D DISPLAY SYSTEM ADAPTED FOR THE SAME

CROSS-REFERENCE TO RELATED PATENT APPLICATIONS

This application is a U.S National Stage Application under 35 U.S.C. §371 of PCT Application No. PCT/KR2010/002714, filed Apr. 29, 2010, which claims priority to U.S. Provisional Patent Application No. 61/219,392 filed Jun. 23, 2009, whose entire disclosures are hereby incorporated by reference.

TECHNICAL FIELD

The present invention relates to shutter glasses to be used for viewing a 3D image and a method for adjusting the characteristics of the shutter glasses. Also, the present invention relates to a three-dimensional (3D) display system adapted for using the shutter glasses.

BACKGROUND ART

The advancement of television technique has reached a level of implementing a device for displaying a stereoscopic image. Various stereoscopic image display schemes have been proposed, and at a time when the present invention is filed, a full-fledged commercialization of a stereoscopic type 3D television is at hand. In a stereoscopic 3D system, two images are captured by using two image sensors which are away from each other by about 65 millimeters, just like the human's eyes, and the captured images are transmitted as a broadcast signal to a receiver. Then, the receiver makes the two images separately inputted to left and right eyes of a viewer (i.e., a user), thereby simulating binocular disparity to allow for a depth perception and stereoscopic vision.

In the stereoscopic display device, two images, namely, left and right images, constituting a pair of stereoscopic images are accurately inputted to the left and right eyes of the viewer. That is, it is important to prevent the two images from being simultaneously inputted to any of the two eyes not to cause interference. In order to exclude interference, the existing stereoscopic display device may require special glasses such as shutter glasses controlling the passage of left and right images in a time division scheme, anaglyph glasses using a spectrum difference, polarization glasses using polarization, and the like. Among them, the shutter glasses are configured such that only a left-eye shutter of the shutter glasses is open when a left image is displayed on a display screen of a display device, and only a right-eye shutter is open when a right image is displayed, in order to deliver the left and right images to a viewe's left and right eyes, respectively.

However, the related art have fixed light transmission characteristics, for example, brightness and color temperature, so it cannot properly reflect a viewer preference or image characteristics. Namely, the viewer may desire to view a brighter or darker image or adjust color temperature because of his preference or surrounding environments or in consideration of types of images, but the existing glasses fails to satisfy these needs.

DISCLOSURE OF INVENTION

Technical Problem

Therefore, an object of the present invention is to provide shutter glasses capable of automatically changing brightness according to image characteristics and allowing a viewer to adjust brightness or a color temperature arbitrarily according to his preference.

Another object of the present invention is to provide a method for adjusting optical characteristics of shutter glasses capable of automatically changing brightness according to image characteristics.

Still another object of the present invention is to provide a display system capable of automatically changing brightness according to image characteristics and allowing a viewer to adjust brightness or a color temperature according to his preference.

Solution to Problem

To achieve these and other advantages and in accordance with the purpose of the present invention, as embodied and broadly described herein, there is provided shutter glasses adaptive to be used for a three-dimensional (3D) display device. The shutter glasses include: a pair of shutter liquid crystal panels prepared to correspond to user's left and right eyes; and a controller configured to turn on and off the shutter liquid crystal panels at a certain frequency and control light transmittance of the shutter liquid crystal panels by a gamma voltage corresponding to a certain level control signal.

In a preferred exemplary embodiment, the shutter glasses may further include light sources installed at corners of the shutter liquid crystal panels to output light to the shutter liquid crystal panels to vary a color temperature.

In an exemplary embodiment, the level control signal may be received from the 3D display device. However, in a different exemplary embodiment, the level control signal may be received from a mode switch provided in the shutter glasses.

In a preferred exemplary embodiment, the controller may include: a voltage determining unit configured to determine the gamma voltage correspondingly according to the level control signal; a voltage generating unit configured to generate a driving reference voltage according to the gamma voltage; and a source driving unit configured to drive sources of the shutter liquid crystal panels based on the driving reference voltage. In the exemplary embodiment, the controller may further include a look-up table for storing a mapping relationship between the level control signal and the gamma voltage.

In a preferred exemplary embodiment, each of the light sources may include red, green and blue LED combinations, and the controller may control light emission of each of the red, green and blue colors.

To achieve the above objects, there is also provided a method for adjusting light characteristics of shutter glasses having a shutter liquid crystal panel and being adaptive to be used for a three-dimensional (3D) display device. According to the light characteristics adjusting method, a certain level control signal is received, and then a gamma voltage for driving the shutter liquid crystal panel is changed correspondingly according to the level control signal, thus varying light transmittance of the shutter liquid crystal panel.

In an exemplary embodiment, the level control signal is received from the 3D display device. The level control signal may be determined based on an average picture level (APL) of an image displayed on the 3D display device.

In a preferred exemplary embodiment, the 3D display device may convert a frame rate of an image signal received from a signal source such that it is double, and display the same on a display panel.

In a preferred exemplary embodiment, the shutter glasses may include red, green and blue light emitting units. In adjusting the light characteristics, the red, green and blue light emitting units are independently driven to adjust a color temperature of the shutter glasses.

To achieve the above object, there is also provided a display system including: a display device configured to display a pair of three-dimensional (3D) stereoscopic images corresponding to a 3D image signal; and shutter glasses allowing the pair of 3D stereoscopic images to alternately pass therethrough. The display device may include: a calculation unit configured to calculate an average luminance level from the pair of 3D stereoscopic images and generate a level control signal based on the average luminance level. The shutter glasses may include: a pair of shutter liquid crystal panels prepared to correspond to user s left and right eyes; and a controller configured to turn on and off the shutter liquid crystal panel at a certain frequency and control a light transmittance of the shutter liquid crystal panels by a gamma voltage corresponding to the level control signal.

In a preferred exemplary embodiment, the display device may include: a display panel configured to display the 3D image signal; a frame conversion unit configured to convert a frame rate of the 3D image signal; a driving circuit configured to generate a certain driving control signal to drive the display panel according to the image signal having the converted frame rate; and a transmission unit configured to transmit a synchronization reference signal corresponding to the driving control signal to the shutter glasses. The controller of the shutter glasses may turn on and off the shutter liquid crystal panels according to the synchronization reference signal. Preferably, the driving control signal is a gate start pulse (GSP) signal.

According to exemplary embodiments of the present invention, light transmittance of shutter glasses can be automatically varied according to brightness of a 3D image displayed on the display device, and a viewer may adjust brightness or a color temperature of the shutter glasses according to his preference. Thus, the brightness of an image can be automatically adjusted according to a level with which the viewer feels comfortable, and thus, the brightness and color temperature personalized to the user preference can be provided.

Therefore, the utility and satisfaction of the 3D display device and a 3D image can be improved.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a detailed block diagram of the television receiver illustrated in FIG. 1;

FIG. 3 is a detailed block diagram of the shutter glasses illustrated in FIG. 1;

FIGS. 4 and 5 illustrate examples of look-up tables of average picture levels (APL);

FIG. 6 illustrates a crosstalk between left and right images;

FIG. 7 is a view for explaining conversion of a frame rate by a frame rate conversion unit;

FIG. 8 illustrates a time point at which a shutter liquid crystal panel is open and closed with respect to an image having a converted frame rate;

MODE FOR THE INVENTION

Reference will now be made in detail to the preferred embodiments of the present invention, examples of which are illustrated in the accompanying drawings.

Figure 1:
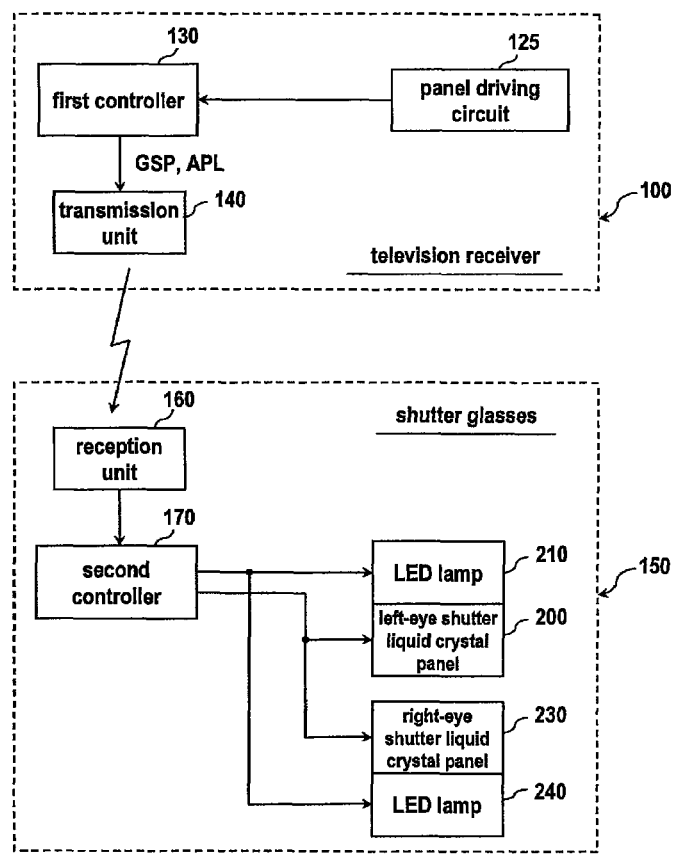
FIG. 1 is a schematic block diagram of a television receiver and shutter glasses according to an exemplary embodiment of the present invention.

FIG. 1 is a schematic block diagram of a three-dimensional (3D) television receiver and shutter glasses according to an exemplary embodiment of the present invention. The 3D television receiver system illustrated in FIG. 1 includes a television receiver 100 and shutter glasses 150.

The television receiver 100 receives a three-dimensional (3D) broadcast signal received via terrestrial waves or a cable TV network and displays a 3D image corresponding to the 3D broadcast signal in a stereoscopic manner. In particular, in the present exemplary embodiment, the television receiver 100 alternately displays left and right images constituting a pair of stereoscopic images on a liquid crystal panel (not shown in FIG. 1).

A panel driving circuit 125 installed in the television receiver 100 converts a digital image signal such that it is suitable to be displayed on a liquid crystal panel, and generates various control signals such as a timing control signal and the like. The panel driving circuit 125 provides one of the control signals, for example, a gate start pulse (GSP) signal, as a synchronization reference signal to the shutter glasses 150 via a first controller 130. The first controller 130 calculates an average picture level (APL) from the digital image signal and provides the calculated APL as a level control signal to the shutter glasses 150. A transmission unit 140 receives the synchronization reference signal and the level control signal from the first controller 130 and transmits the received synchronization reference signal and level control signal in a form of infrared ray or RF signal to the shutter glasses 150.

The shutter glasses 150 include a left-eye shutter liquid crystal panel 200 and a right-eye shutter liquid crystal panel 230. The shutter liquid crystal panels 200 and 230 do not have a color filter, serving to simply allow light to pass therethrough or interrupt light according to a source driving voltage. When a left image is displayed on a display surface of the television receiver 100, the left-eye shutter liquid crystal panel 200 allows light to pass therethrough and the right-eye shutter liquid crystal panel 230 interrupts light transmission so that the left image can be transmitted to the left eye of the user wearing glasses. Meanwhile, when the right image is displayed on the display surface of the television receiver 100, the left-eye shutter liquid crystal panel 200 interrupts light transmission and the right-eye shutter liquid crystal panel 230 allows light to pass therethrough so that the right image can be transmitted only to the right eye of the user.

In this process, a reception unit 160 of the shutter glasses 150 converts the infrared or RF signal which has been received from the transmission unit 140 of the television receiver 100 into an electrical signal and provides the converted electrical signal to a second controller 170. The second controller 170 provides control to alternately turn on and off the left-eye shutter liquid crystal panel 200 and the right-eye shutter liquid crystal panel 230 according to the synchronization reference signal. In particular, the second controller 170 changes transmission and brightness of images of the shutter liquid crystal panels 200 and 230 according to the level control signal by varying the gamma voltage for operating the shutter liquid crystal panels 200 and 230 according to the level control signal. Also, the second controller 170 may vary a color temperature by adjusting the brightness of LED lamps 210 and 240 attached to corners of the shutter liquid crystal panels 200 and 230 according to a color temperature mode set by the user.

FIG. 2 is a detailed block diagram of the television receiver 100 illustrated in FIG. 1.

A tuner 102 selects a broadcast signal of a channel selected by the user from among a plurality of broadcast signals and outputs the selected broadcast signal. A demodulation and channel decoding unit 104 demodulates the broadcast signal transferred from the tuner 102, performs error-correction-decoding on the demodulated signal, and outputs a transport stream (TS). A transport demultiplexing unit 106 demultiplexes the TS to separate it into a video PES and an audio PES and extracts PSI/PSIP information. A depacketization unit (not shown) performs depacketizing on the video PES and the audio PES to restore the video ES and the audio ES.

A voice decoder 108 decodes the audio ES and outputs an audio bit stream. The audio bit stream is converted into an analog voice signal by a digital-to-analog converter (not shown), amplified by an amplifier (not shown), and then outputted via a speaker (not shown). An image decoder 110 decodes the video ES to extract a video bit stream. The image decoder 110 decodes the video bit stream to output a left image signal and a right image signal for implementing a stereoscopic 3D image.

A frame rate converter (FRC) 111 converts a frame rate of 60 Hz of the left image signal and the right image signal into a frame rate of 120 Hz in order to reduce crosstalk between the left image and the right image (to be described).

A formatter 112 compares the left and right images signals over a frame time and performs formatting so that temporally consistent left and right images can be displayed as a pair on a display unit 120. The display unit 120 includes a panel driving circuit 125 and a liquid crystal panel 128. The panel driving circuit 125 converts the left and right image signals such that they are suitable to be displayed on the liquid crystal panel 128, and generates various control signals such as a timing control signal and the like. The liquid crystal panel 128 driven by the control signal alternately displays left and right images corresponding to the left image signal. As mentioned above, in the operational process, the panel driving circuit 125 provides one of the control signals, for example, a gate start pulse (GSP) signal, as a synchronization reference signal to the controller 130.

In the controller 130, the PSI/PSIP processing unit 132 receives the PSI/PSIP information from the transport demultiplexing unit 106, parses the received PSI/PSIP information, and stores the parsed information in a memory (not shown) or a register, so that a broadcast signal can be decoded and a broadcast can be reproduced based on the stored information. An APL calculator 134 receives an image signal from the image decoder 110 or the panel driving circuit 125 and calculates an APL of the image. A main controller 136 controls an overall operation of the receiver and transmits the gate start pulse (GSP) signal and the APL as a synchronization reference signal and a level control signal, respectively, in the form of an infrared or RF signal to the shutter glasses 150 via the transmission unit 140. The transmission unit 140 transmits the synchronization reference signal and the level control signal as signals following an IrDA or RF protocol to the shutter glasses 150. In an exemplary embodiment, when the transmitted signal is an infrared signal, the infrared signal follows an NEC key code format.

Here, the APL is a value obtained by averaging picture levels of pixels included in a frame or field. The APL may be calculated for every pixel included in a frame or field image, or may be calculated only for pixels without a motion such as a background or the like in an image. In a preferred exemplary embodiment, the APL is calculated by using only an image of a base view among a left image and a right image. However, in a modification, the APL may be calculated by using the both left and right images or may be calculated separately for the left and right images so as to be provided to the shutter glasses 150.

FIG. 3 is a detailed block diagram of the shutter glasses illustrated in FIG. 1. The shutter glasses 150 includes a reception unit 160, a second controller 170, a programmable voltage controller 180, mode switches 182, 184, and 186, a source driving unit 190, a left-eye shutter liquid crystal panel 200, a left LED lamp 210, a light concentration sheet assembly 220, a right-eye shutter liquid crystal panel 230, a right LED lamp 240, and a light concentration sheet assembly 250. In addition, the shutter glasses 150 include a battery for feeding power.

The reception unit 160 converts an infrared or RF signal transferred from the television receiver 100 into an electrical signal and provides the same to the second controller 170.

The second controller 170 includes an APL look-up table 172 and a shutter opening and shutting interval controller 174. The APL look-up table 172 stores a mapping relationship between APL values and gamma voltages for driving the LED lamps 210 and 240. The shutter opening and shutting interval controller 174 determines an opening time point and an opening state duration of the left and right shutter liquid crystal panels 200 and 230 according to the synchronization reference signal, namely, according to the gate start pulse (GSP) signal. The second controller 170 determines a gamma voltage with reference to the APL look-up table 172 based on the APL. The second controller 170 outputs a gamma voltage value for driving the shutter liquid crystal panels 200 and 230 and timing information of the opening and shutting. In addition, the second controller 170 outputs a color temperature control signal according to a color temperature which has been set as a basic value or which has been set by the user.

FIGS. 4 and 5 illustrate examples of look-up tables of average picture levels (APL). The APL look-up table 172 includes two tables selectively used according to operation modes. In the present exemplary embodiment, it is assumed that the APL has one to five values. Value 1 indicates the lowest APL and value 5 indicates the highest APL. Also, it is assumed that the gamma voltages may have a range from a threshold voltage of 2V to a maximum voltage of 6V, wherein the shutter liquid crystal panels 200 and 230 are turned on at the threshold voltage of 2V. According to a first look-up table illustrated in FIG. 4, the gamma voltages have a larger value as the APL value is larger. When the first look-up table is in use, as an image displayed on the liquid crystal panel 128 of the television receiver 100 is brighter, an image that passes through the shutter glasses 150 becomes brighter. According to a second look-up table illustrated in FIG. 5, the gamma voltages have a smaller value as the APL value is larger. When the second look-up table is in use, as an image displayed on the liquid crystal panel 128 of the television receiver 100 is darker, an image that passes through the shutter glasses 150 becomes brighter.

The programmable voltage controller 180 receives the gamma voltage value and the opening and shutting timing information and supplies a driving reference voltage to the source driving unit 190, so that the source driving unit 190 controls opening and shutting of the left and right shutter liquid crystal panels 200 and 230 based on the driving reference voltage. Meanwhile, the programmable voltage controller 180 supplies an LED driving voltage to the left and right LED lamps 210 and 240 according to a color temperature control signal transferred from the second controller 170. In a preferred exemplary embodiment, the LED driving voltage is generated for a red color, a green color, and a blue color in order to separately drive a red LED, a green LED, and a blue LED constituting the LED lamps 210 and 240.

The mode switches 182, 184, and 186 serve to select an operation mode of the shutter glasses 150 and are formed on an outer circumferential surface of the shutter glasses 150. The mode switch 182 serves to select an automatic brightness adjustment mode. Each time the mode switch 182 is pressed, one of three types of automatic brightness adjustment modes of 'dynamic contrast', 'default' and 'glaring prevention' is selected. The mode switch 184 serves to select a manual brightness adjustment mode and select a concrete brightness level. Each time the mode switch 184 is pressed, a brightness level increases circulatorily. The mode switch 186 serves to adjust a color temperature of the shutter liquid crystal panels 200 and 230 to one of three types of, for example, 'cool', 'average' and 'warm'.

In the interior of the frame, namely, a glass frame, for setting up the shutter liquid crystal panels 200 and 230, the left LED lamp 210 is installed through, for example, molding at the corner of the left-eye shutter liquid crystal panel 200 by the medium of the light concentration sheet assembly 220. In a preferred exemplary embodiment, a plurality of left LED lamps 210 is provided. In particular, in a preferred exemplary embodiment, two left LED lamps 210 are provided to face each other. The light concentration sheet assembly 220 includes a light guide plate 222, a diffusion sheet 224, a prism sheet 226, and a protection film 228. The light guide plate 222 guides light inputted from the left LED lamp 210 and evenly distribute it to the left-eye shutter liquid crystal panel 200. The diffusion sheet 224 uniformly spreads light outputted from the light guide plate 222 to thereby reduce partial luminance non-uniformity and increase luminance in the direction of the left-eye shutter liquid crystal panel 200. The prism sheet 226 concentrates light outputted from the diffusion sheet 224 to the left-eye shutter liquid crystal panel 200 to improve directionality and further increase the luminance in the direction of the left-eye shutter liquid crystal panel 200. The protection film 228 protects the prism sheet 226 to prevent damage to the prism sheet 226.

Likewise, the right LED lamp 240 is installed at the corner of the right-eye shutter liquid crystal panel 230 by the medium of a light concentration sheet assembly 250. In a preferred exemplary embodiment, a plurality of right LED lamps 240 are provided. In particular, in a preferred exemplary embodiment, two right LED lamps 240 are provided to face each other. The light concentration sheet assembly 250 includes a light guide plate 252, a diffusion sheet 254, a prism sheet 256, and a protection film 258. The light guide plate 252 guides light inputted from the right LED lamp 240 and evenly distribute it to the right-eye shutter liquid crystal panel 230. The diffusion sheet 254 uniformly spreads light outputted from the light guide plate 252 to thereby reduce partial luminance non-uniformity and increase luminance in the direction of the right-eye shutter liquid crystal panel 230. The prism sheet 256 concentrates light outputted from the diffusion sheet 254 to the right-eye shutter liquid crystal panel 230 to improve directionality and further increase the luminance in the direction of the right-eye shutter liquid crystal panel 230. The protection film 258 protects the prism sheet 256 to prevent damage to the prism sheet 256.

The light guide plates 222 and 252 are fabricated by injection-molding or casting an acryl (PMMA) and include a pattern such as a dot pattern, a shibo pattern, a V-cut pattern, and the like. The diffusion sheets 224 and 254 are fabricated by forming a spherical shape on a polyester (PET) base with an acrylic resin. The prism sheets 226 and 256 are fabricated by regularly forming a prism shape on a polyester (PET) base with an acrylic resin. The protection films 228 and 258 are implemented by using a diffusion sheet having a high transmittance.

Illumination of the left and right LED lamps 210 and 240 are controlled by an LED driving voltage transferred from the programmable voltage controller 180 to irradiate light to the left and right shutter liquid crystal panels 200 and 230. In particular, as mentioned above, each of the red, green and blue LEDs constituting the LED lamps 210 and 240 is driven by a separate driving voltage, and accordingly, the color temperature of the shutter liquid crystal panels 200 and 230 can be controlled.

The television receiver system illustrated in FIGS. 1 to 5 operates as follows.

In the television receiver 100, a broadcast signal selected by the tuner 102 is demodulated and error-correction-decoded by the demodulation and channel decoding unit 104, and accordingly, a transport stream (TS) is restored. The TS is separated into a video PES and an audio PES, and a video ES and an audio ES are restored by depacketizing the video PES and an audio PES. An audio bit stream generated from the audio PES is converted into an analog voice signal, amplified, and then outputted via the speaker. Meanwhile, the video ES is decoded by the image decoder 110, and the decoded signal is converted into a signal having a frame rate of 60 Hz to 120 Hz by the frame rate converter 111. The frame rate-converted signal is formatted by the formatter 112 and then displayed on the display unit 120.

In this case, the panel driving circuit 125 of the display unit 120 provides one of control signals as a synchronization reference signal to the shutter glasses 150 via the first controller 130. In particular, in a preferred exemplary embodiment, in order to reduce a delay time, a timing control circuit (T-CON) in the panel driving circuit 125 uses one of the control signals supplied to the source driver, a final output terminal, namely, a gate start pulse (GSP) signal as a synchronization reference signal. Here, the gate start pulse (GSP) signal refers to a reference signal informing about a first gate line of the liquid crystal panel, which is generated one time per frame.

The process of converting a frame rate in the frame rate converter 111 will now be described in more detail.

When a 60 Hz 3D image of 1080 pixels is applied to the full HD liquid crystal panel 128, a total of 60 frames, including 30 left image frames and 30 right image frames, are displayed for one second. In this case, a driving time of one frame is 16.6 ms(=1 sec/60 frames). When the liquid crystal panel is driven, the entire screen is not driven simultaneously like an impulse scheme, but 1920 pixels in one gate line are driven for some 14.7 ms and then the voltage which has been applied to liquid crystal is held for 16.6 ms.

Because left and right frames are sequentially driven, even when there is a change in the left and right frames, crosstalk of an image is generated due to the holding of the liquid crystal voltage of the pixels of the left and right frames. For example, as shown in FIG. 6, even after the left image starts to be displayed at an upper end of the screen, the right image is held at a lower portion of the screen, and even after the right image starts to be displayed at the upper end of the screen, the left image is held at the lower portion of the screen. Namely, at the time interval 260 during which the shutter glasses 150 allows only the right image to pass therethrough, the right image starts to be gradually displayed from the upper end of the screen, and the left image remaining at the lower portion of the screen is gradually replaced by the right image from the upper side. Also, at a time interval 270 during which the shutter glasses 150 allows only the left image to pass therethrough, the left image starts to be gradually displayed from the upper end of the screen, and the right image remaining at the lower portion of the screen is gradually replaced by the left image from the upper side.

Unless the transmittance of the of the left and right shutter liquid crystal panels 200 and 230 is partially changed while matching synchronization between the shutter glasses and a panel image, crosstalk of left and right images may be generated. Such crosstalk causes a viewer to be confused with a depth sense, making the viewer feel headache, dizzy and nausea. Thus, the importance of synchronization between the shutter glasses and an image is emphasized, and the importance of a method for restraining generation of crosstalk is also emphasized.

In order to accurately match synchronization between the shutter glasses and an image and reduce crosstalk, it is preferred to consider a response time of the shutter glasses, a delay time with a synchronization reference signal generated in the television receiver up to an image driving time, and the configuration of an image displayed on the television receiver.

In order to minimize the delay time with the synchronization reference signal up to the image driving time, in the system according to an exemplary embodiment of the present invention, as described above, the timing control circuit (T-CON) in the panel driving circuit 125 uses one of the control signals supplied to the source driver, a final output terminal, namely, a gate start pulse (GSP) signal as a synchronization reference signal.

In order to reduce crosstalk in terms of the configuration of an image, in the system according to an exemplary embodiment of the present invention, the frame rate converter (FRC) 111 converts a frame rate of 60 Hz of the left image signal and the right image signal into a frame rate of 120 Hz. Namely, as shown in FIG. 7, the system according to an exemplary embodiment of the present invention converts the 60 Hz image for displaying a total 60 frames including 30 left image frames and 30 right image frames for one second into 120 Hz, so that a total of 120 frames, including 60 left image frames and 60 right image frames, can be displayed on the liquid crystal panel 128 for one second.

A time point for opening and shutting the shutter liquid crystal panels 200 and 230 with respect to the 120 Hz image having the converted frame rate is illustrated in FIG. 8. As shown in FIG. 8, an opening time point and a shutting time point with respect to the left image are delayed by a certain time (DT), and accordingly, a shutter activation interval 280 is delayed by the time (DT). Also, an opening time point and a shutting time point with respect to the right image are delayed by a certain time (DT), and accordingly, a shutter activation interval 290 is delayed by the time (DT). As noted in FIG. 8, crosstalk between left and right images is considerably reduced. To this end, the shutter glasses 150 generates a gamma voltage such that it is delayed by the time (DT) compared with the synchronization reference signal.

In this manner, according to a preferred exemplary embodiment of the present invention, the frame rate of the left and right images is converted, the synchronization reference frequency is changed, and the shutter glasses 150 additionally delays synchronization, thereby improving crosstalk between the left and right images.

The operation of the shutter glasses 150 will now be described with reference to FIGS. 9 to 13.

Figure 9:
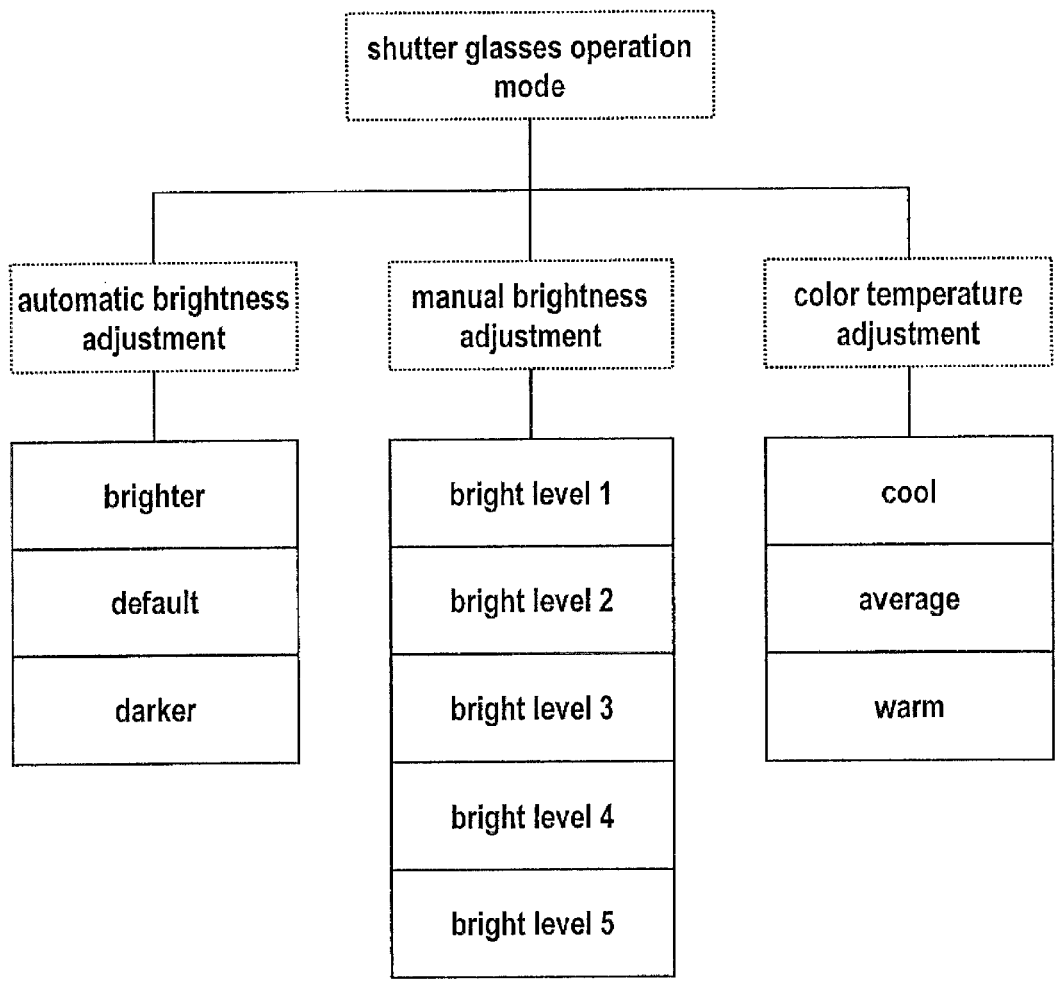
FIG. 9 illustrates operation modes that can be selected by mode switches in the shutter glasses of FIG. 3.

FIG. 9 illustrates operation modes that can be selected by the mode switches 182, 184, and 186 in the shutter glasses of FIG. 3. The user may select one of three types of automatic brightness adjustment modes of 'dynamic contrast', 'default' and 'glaring prevention' by pressing the mode switch 182. Also, the user may select a manual brightness adjustment mode in order to designate (or set) a concrete brightness level by using the mode switch 184. Each time the user presses the mode switch 184, the brightness levels of the shutter glasses 150 increase circularitorily from a 'brightness level 1' to a 'brightness level 5'. Meanwhile, the user may set the color temperature of the shutter liquid crystal panels 200 and 230 by one of three types of 'cool', 'average' and 'warm' by pressing the mode switch 186.

Figure 10:
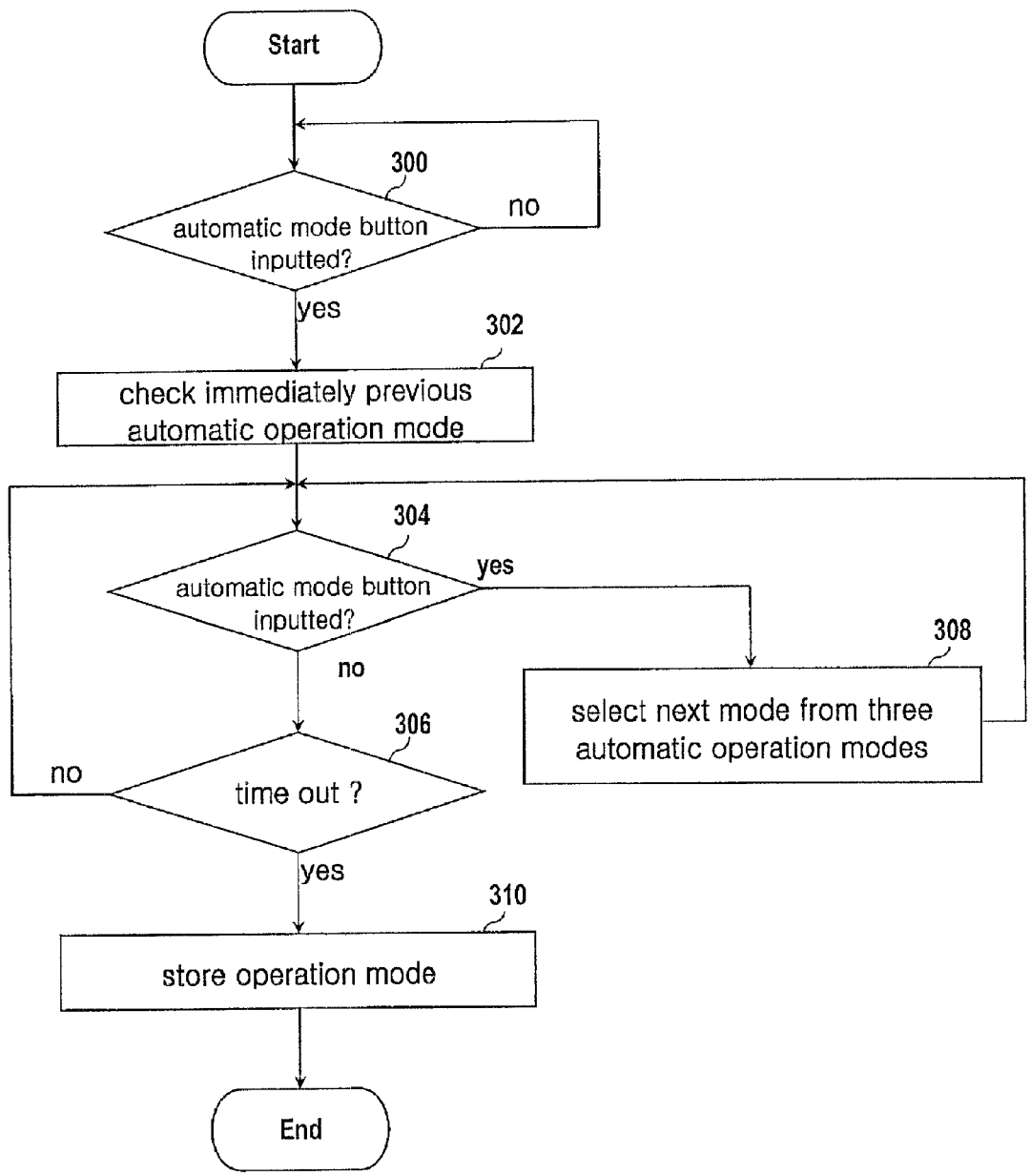
FIG. 10 is a flow chart illustrating the process of selecting an automatic brightness adjustment mode.

FIG. 10 is a flow chart illustrating the process of selecting the automatic brightness adjustment mode. The automatic brightness adjustment mode includes three types: 'dynamic contrast', 'default' and 'glaring prevention', and one of them may be selected by pressing the mode switch 182.

When the mode switch 182 includes a button input (step 300), the second controller 170 checks an immediately previous automatic brightness adjustment mode from a memory (not shown) (step 302). In this state, the second controller 170 monitors whether or not there is a button input of the mode switch 182 again (step 304). If there is no button input within a certain standby time (step 306), the current automatic brightness adjustment mode is stored in the memory and the selecting process is terminated (step 310). If it is determined that the standby time has not lapsed in step 306, the selecting process returns to step 5304 and it is monitored whether or not there is an additional button input of the mode switch 182.

Meanwhile, if it is determined that there is a button input of the mode switch 182 in step 304, the following operation mode is selected from the three types of automatic brightness adjustment modes (step 308). For example, if the immediately previous operation mode is 'dynamic contrast' mode, the 'default' mode is selected as a new operation mode. When the immediately previous mode is the 'default' mode, the 'glaring prevention' mode is selected as a new operation mode. If the immediately previous mode is 'glaring prevention' mode, the 'dynamic contrast' mode is selected as a new operation mode. Thereafter, in the selecting process, step 304 proceeds and it is monitored whether or not there is an additional button input of the mode switch 182.

This process is repeatedly performed and whenever there is a button input of the mode switch 182, the automatic brightness adjustment mode is changed (steps 304 and 308). If there is no button input for a certain time period, the second controller 170 stores the automatic brightness adjustment mode in the memory and terminates the selecting process (steps 306 and 310).

Figure 11:
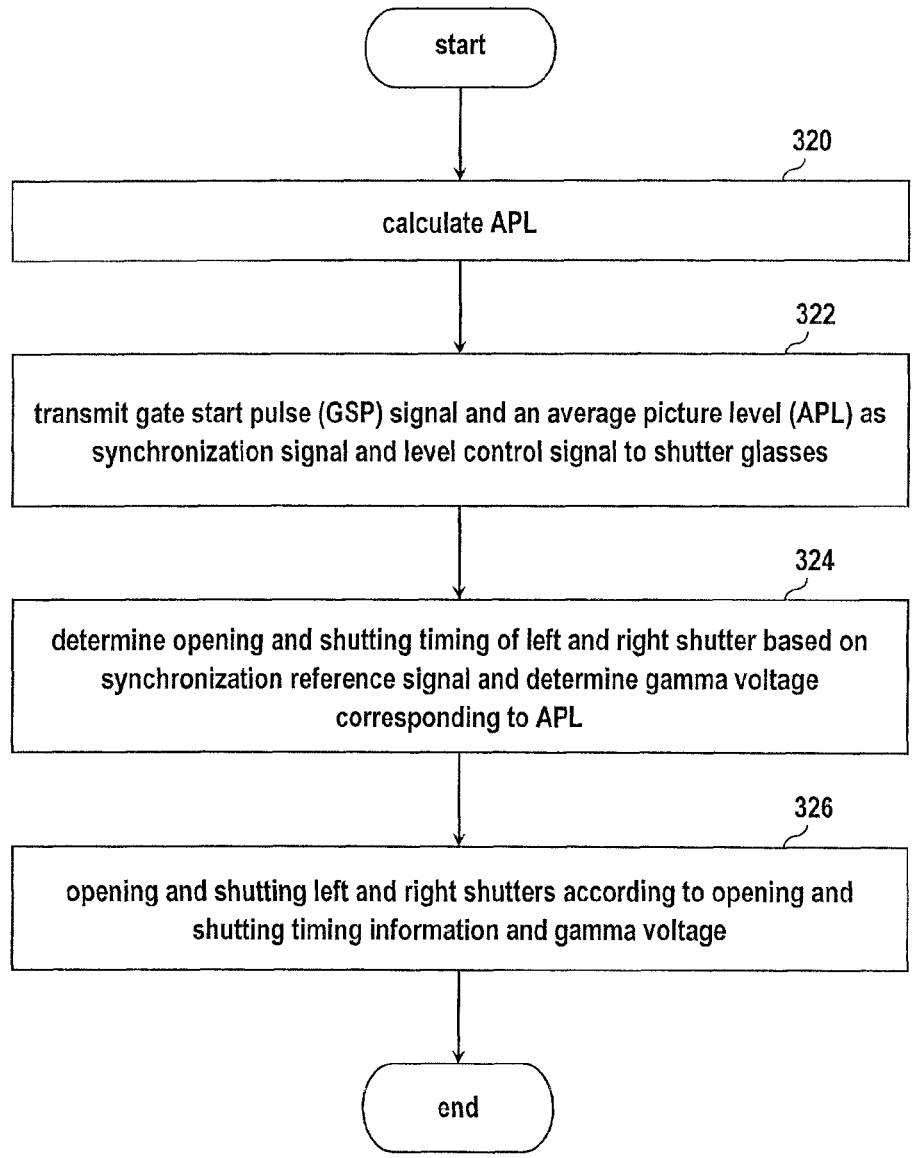
FIG. 11 is a flow chart illustrating the process of an operation of shutter glasses in the automatic brightness adjustment mode.

FIG. 11 is a flow chart illustrating the process of an operation of shutter glasses in the automatic brightness adjustment mode. In the automatic brightness adjustment mode, the transmittance of the left and right shutter liquid crystal panels 200 and 230 and brightness of an image that passes through the shutter glasses 150 are changed cooperatively according to the APL of the image.

In this mode, the APL calculation unit 134 of the television receiver 100 receives an image signal from the image decoder 110 or from the panel driving circuit 125, and calculates an APL of the image (step 320). The APL may be calculated for every pixel included in the frame and field image or may be calculated for only pixels that does not move such as a background and the like in the image. In step 322, the main controller 136 of the television receiver 100 transmits the gate start pulse (GSP) signal and the APL as a synchronization reference signal and a level control signal to the shutter glasses 150 through the transmission unit 140.

The second controller 170 of the shutter glasses 150 determines an opening timing and a shutting timing of the left and right shutter liquid crystal panels 200 and 230 based on the synchronization reference signal. Also, the second controller 170 determines a gamma voltage corresponding to the APL with reference to the APL look-up table 172 (step 324). When the shutter glasses 150 is in the automatic brightness adjustment mode of 'dynamic contrast', if the APL value is high, the second controller 170 determines a large gamma voltage, so that the image that passes through the shutter glasses 150 can become brighter as the image displayed on the liquid crystal panel 128 is brighter. Meanwhile, when the shutter glasses 150 is in the automatic brightness adjustment mode of 'glaring prevention', if the APL value is high, the second controller 170 determines a small gamma voltage, so that the image that passes through the shutter glasses 150 is darker. As the image displayed on the liquid crystal panel 128 is brighter.

In step 326, the programmable voltage controller 180 generates a driving reference voltage according to the gamma voltage determined by the second controller 170 and the opening and shutting timing information, to allow the source driving unit 190 to control opening and shutting of the left and right shutter liquid crystal panels 200 and 230.

In particular, in the automatic operation mode of 'dynamic contrast' the transmittance of the left and right shutter liquid crystal panels 200 and 230 is controlled such that as the image made incident to the shutter glasses 150 from the liquid crystal panel 128 of the television receiver 100 is brighter, the image that passes through the left and right shutter liquid crystal panels 200 and 230 is brighter. In the automatic operation mode of 'glaring prevention', the transmittance of the left and right shutter liquid crystal panels 200 and 230 is controlled such that as the image made incident to the shutter glasses 150 from the liquid crystal panel 128 of the television receiver 100 is brighter, the image that passes through the left and right shutter liquid crystal panels 200 and 230 is darker. In this manner, in the automatic operation mode of 'dynamic contrast' or 'glaring prevention', the transmittance of the left and right shutter liquid crystal panels 200 and 230 is continuously changed according to the APL of an image, and accordingly, the brightness of the image that passes through the liquid crystal panel is continuously changed in the units of frames or fields. Meanwhile, in the 'default' mode, the transmittance of the left and right shutter liquid crystal panels 200 and 230 is uniformly maintained regardless of the APL.

Figure 12:
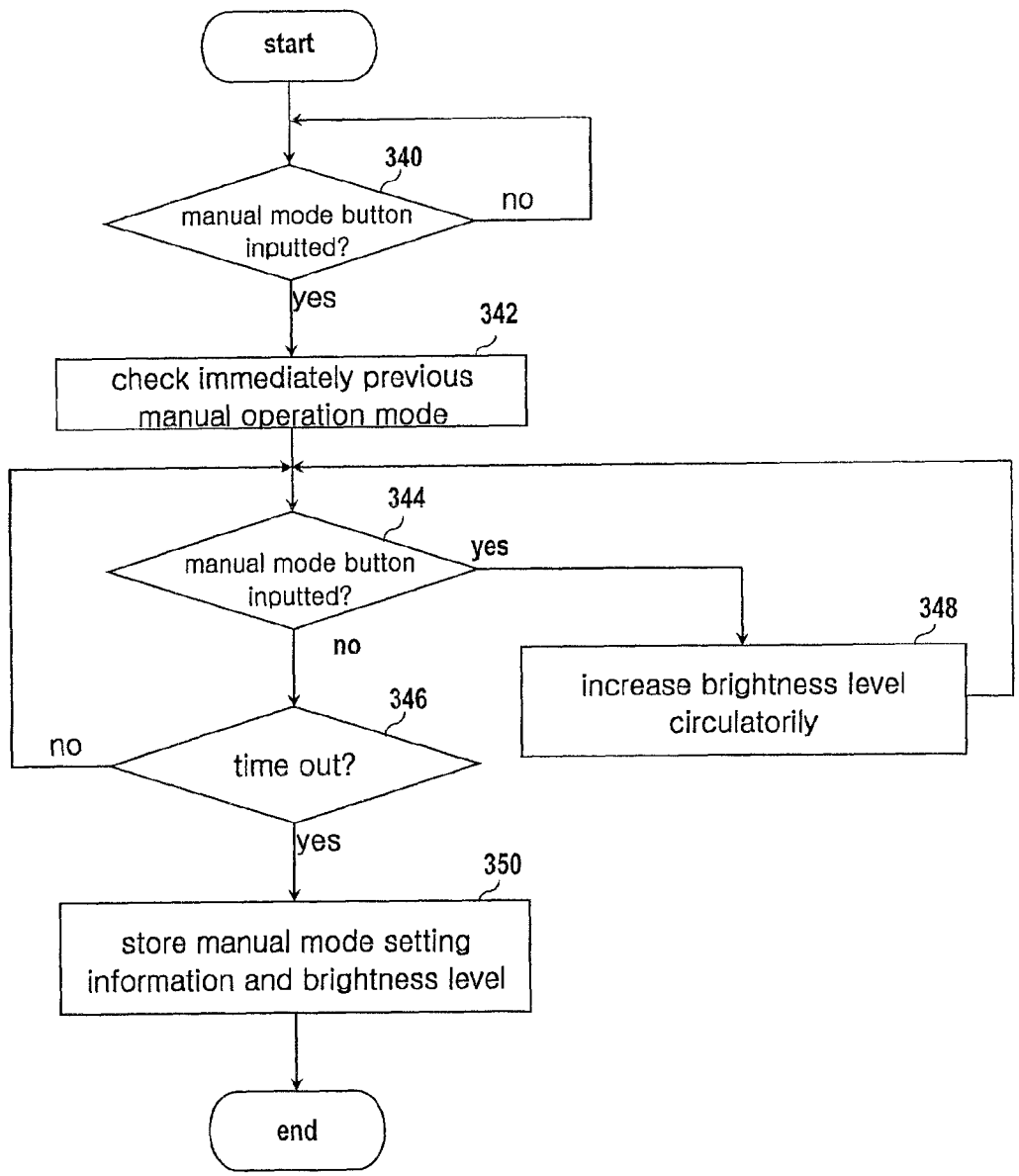
FIG. 12 is a flow chart illustrating the process of selecting a manual brightness adjustment mode.

FIG. 12 is a flow chart illustrating the process of selecting the manual brightness adjustment mode. The manual brightness adjustment mode may be selected by pressing the mode switch 184.

When there is a button input of the mode switch 184 (step 340), the second controller 170 checks an immediately previous manual brightness level from the memory (not shown) (step 302). In this state, the second controller 170 monitors whether or not there is a button input of the mode switch 184 again (step 344). If there is no button input within a certain time period (step 346), a current manual brightness level is stored in the memory and the selecting process is terminated (step 350). If it is determined that a standby time has not lapsed in step 346, the selecting process proceeds to step 344 and the second controller 170 monitors whether or not there is an additional button input of the mode switch 184.

Meanwhile, if it is determined that there is a button input of the mode switch 184 again in step 344, the second controller 170 increases the brightness level circulatorily (step 348). For example, if the immediately previous brightness level is 1, the brightness level 2 is selected as a new brightness level. If the immediately previous brightness level is 2, the brightness level 3 is selected as a new brightness level. If the immediately previous brightness level is 3, the brightness level 4 is selected as a new brightness level. If the immediately previous brightness level is 4, the brightness level 5 is selected as a new brightness level. If the immediately previous brightness level is 5, the brightness level 1 is selected as a new brightness level. Thereafter, the selecting process proceeds step 344 and the second controller 170 monitors whether or not there is an additional button input of the mode switch 184.

This process is repeatedly performed, and whenever there is a button input of the mode switch 184, the brightness level of the shutter liquid crystal panels 200 and 230 increases circulatorily from the level 1 to level 5 (steps 344 and 348). When there is no button input during a certain time period, the second controller 170 stores a manual mode setting flag and the current manual brightness level in the memory and terminates the selecting process (steps 346 and 350).

In the manual brightness adjustment mode, the second controller 170 of the shutter glasses 150 reads the manual brightness level stored in the memory and determines a corresponding gamma voltage. Also, the second controller 170 determines an opening timing and a shutting timing of the left and right shutter liquid crystal panels 200 and 230 according to the synchronization reference signal. The programmable voltage controller 180 generates the driving reference voltage according to the gamma voltage value determined by the second controller 170 and the opening timing information to allow the source driving unit 190 to control opening and shutting of the left and right shutter liquid crystal panels 200 and 230 based on the driving reference signal. Accordingly, in the manual brightness adjustment mode, the transmittance of the left and right shutter liquid crystal panels 200 and 230 and the brightness of the image that passes through the shutter glasses 150 are fixed to the brightness level selected by the user.

Figure 13:
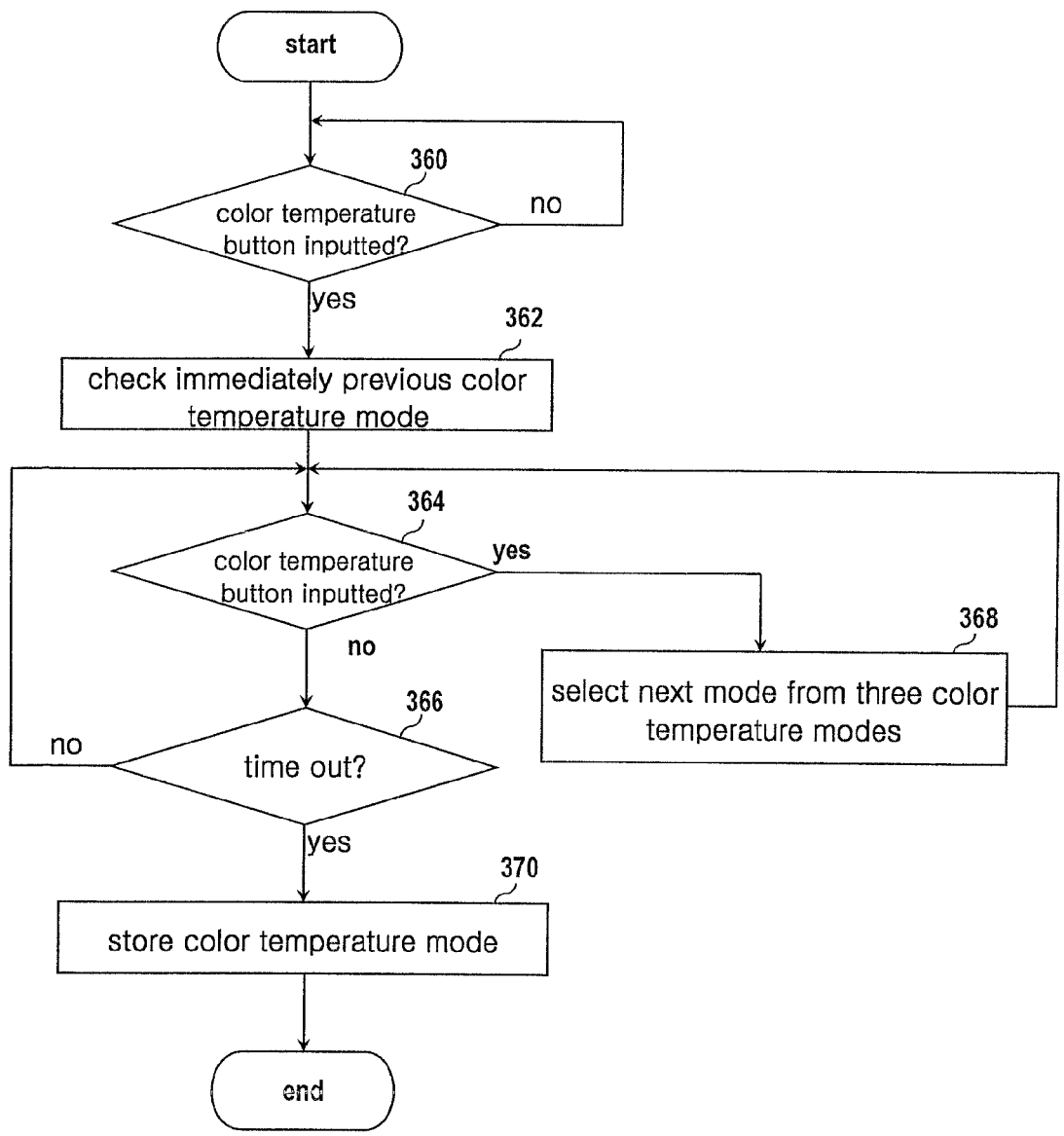
FIG. 13 is a flow chart illustrating the process of selecting a color temperature of shutter liquid crystal panels.

FIG. 13 is a flow chart illustrating the process of selecting a color temperature of shutter liquid crystal panels. The user may set a color temperature of the shutter liquid crystal panels 200 and 230 as one of three types of 'cool', 'average', and 'warm' by pressing the mode switch 186.

When there is a button input of the mode switch 186 (step 360), the second controller 170 checks an immediately previous color temperature mode from the memory (not shown) (step 362). In this state, the second controller 170 monitors whether or not there is a button input of the mode switch 186 again (step 364). If there is no button input within a certain time period (step 366), a current color temperature mode is stored in the memory and the selecting process is terminated (step 370). If it is determined that a standby time has not lapsed in step 366, the selecting process proceeds to step 364 and the second controller 170 monitors whether or not there is an additional button input of the mode switch 186.

Meanwhile, if it is determined that there is a button input of the mode switch 186 again in step 364, a next color temperature mode is selected fro among three types of color temperature modes (step 368). For example, if an immediately previous color temperature mode is the 'cool' mode, the 'average' mode is selected as a new color temperature mode.

If an immediately previous color temperature mode is the 'average' mode, the 'warm' mode is selected as a new color temperature mode. If an immediately previous color temperature mode is the 'warm' mode, the 'cool' mode is selected as a new color temperature mode. Thereafter, the selecting process proceeds to step 364 and it is monitored whether or not there is an additional button input of the mode switch 186.

The process is repeatedly performed, and whenever there is a button input of the mode switch 186, the color temperature mode is changed (step 364 and 368). When there is no button input for a certain time period, the second controller 170 stores the color temperature mode in the memory and terminates the selecting process (steps 366 and 370).

Gain values of each of the red (R), green (G), and blue (B) colors in relation to each color temperature mode are stored in the internal memory of the second controller 170. The second controller 170 supplies the RGB gain values related to a color temperature mode set by the user to the programmable voltage controller 180. The programmable voltage controller 180 supplies the LED driving voltage corresponding to the RGB gain value to the RGB LEDs constituting the LED lamps 210 and 240 to drive each RGB LED. Because the gains of each of the RGB LEDs and corresponding LED driving voltages vary according to each color temperature mode, an image of different color temperature according to a color temperature mode can be viewed.

INDUSTRIAL APPLICABILITY

As described above, in the present invention, the light transmittance of the shutter glasses can be automatically changed according to the brightness of a 3D image displayed on the display device, and the viewer can adjust the brightness of the shutter glasses or a color temperature according to his preference. Thus, the brightness of an image can be adjusted to have a level comfortable for the user can be automatically adjusted according to an illumination state of an area where the display device is installed or an attribute of a displayed image, and a personalized brightness and color temperature suiting the user preference can be provided. Accordingly, the utilization and satisfaction of the 3D display device and a 3D image can be improved.

The preferred exemplary embodiment of the present invention has been described based on the television receiver, but the present invention can be applicable to any other display devices that can display a 3D image such as a PC, a game machine, and the like, in the same manner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A three-dimensional (3D) display system including a display device configured to display a pair of three-dimensional (3D) stereoscopic images corresponding to a 3D image signal, and shutter glasses allowing the pair of 3D stereoscopic images to alternately pass therethrough,
    wherein the display device comprises:
        a calculation unit configured to calculate an average picture level (APL) from the pair of 3D stereoscopic images and generate a level control signal based on the average picture level, and
    the shutter glasses comprises:
        a pair of shutter liquid crystal panels prepared to correspond to a user's left and right eyes; and
        a controller configured to turn on and off the shutter liquid crystal panel at a certain frequency and control a light transmittance of the shutter liquid crystal panels by a gamma voltage corresponding to the level control signal,
    wherein the display device comprises:
        a display panel configured to display the 3D image signal;
        a frame conversion unit configured to convert a frame rate of the 3D image signal;
        a driving circuit configured to generate a certain driving control signal to drive the display panel according to the image signal having the converted frame rate; and
        a transmission unit configured to transmit a synchronization reference signal corresponding to the driving control signal to the shutter glasses,
    wherein the controller of the shutter glasses turns on and off the shutter liquid crystal panels according to the synchronization reference signal.

2. The display system of claim 1, wherein the driving control signal is a gate start pulse (GSP) signal.

3. The display system of claim 1, wherein the shutter glasses receives the level control signal from the display device.

4. The display system of claim 3, wherein the level control signal is determined based on an average picture level (APL) of an image displayed on the display device.

5. The display system of claim 1, the shutter glasses further comprising:
    a mode switch configured to receive the level control signal.

6. The display system of claim 1, wherein the controller of the shutter glasses comprises:
    a voltage determining unit configured to determine the gamma voltage correspondingly according to the level control signal;
    a voltage generating unit configured to generate a driving reference voltage according to the gamma voltage; and
    a source driving unit configured to drive sources of the shutter liquid crystal panels based on the driving reference voltage.

7. The display system of claim 6, wherein the controller of the shutter glasses further comprises a look-up table for storing a mapping relationship between the level control signal and the gamma voltage.

8. The display system of claim 1, the shutter glasses further comprising:
    light sources installed at corners of the shutter liquid crystal panels to output light to the shutter liquid crystal panels to vary a color temperature.

9. The display system of claim 8, wherein each of the light sources comprises red, green and blue LED combinations, and the controller of the shutter glasses controls light emission of each of the red, green and blue colors.

* * * * *